(12) United States Patent
Blaum et al.

(10) Patent No.: US 7,869,152 B2
(45) Date of Patent: Jan. 11, 2011

(54) TECHNIQUES FOR IDENTIFYING SERVO SECTORS IN STORAGE DEVICES

(75) Inventors: Mario Blaum, San Jose, CA (US); Mantle Yu, San Jose, CA (US); Bruce Wilson, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 994 days.

(21) Appl. No.: 11/677,854

(22) Filed: Feb. 22, 2007

(65) Prior Publication Data

US 2008/0204926 A1    Aug. 28, 2008

(51) Int. Cl.
*G11B 5/09* (2006.01)
(52) U.S. Cl. ........................................... 360/39
(58) Field of Classification Search .............. None
See application file for complete search history.

(56) References Cited

U.S. PATENT DOCUMENTS

| 5,384,671 | A * | 1/1995 | Fisher .................... 360/51 |
| 5,903,410 | A | 5/1999 | Blaum et al. |
| 6,226,138 | B1 | 5/2001 | Blaum et al. |
| 6,288,861 | B1 | 9/2001 | Blaum et al. |
| 7,042,666 | B2 * | 5/2006 | Blaum et al. .................. 360/49 |
| 7,050,250 | B2 | 5/2006 | Kosugi et al. |
| 7,227,710 | B2 * | 6/2007 | Blaum et al. .................. 360/49 |
| 2004/0223247 | A1 * | 11/2004 | Kosugi et al. ................. 360/48 |
| 2005/0068651 | A1 * | 3/2005 | Blaum et al. .................. 360/48 |
| 2005/0068663 | A1 * | 3/2005 | Blaum et al. ............. 360/78.04 |

* cited by examiner

*Primary Examiner*—Joseph H Feild
*Assistant Examiner*—Huy D Nguyen
(74) *Attorney, Agent, or Firm*—Steven J. Cahill (57) ABSTRACT

Techniques are provided for identifying the servo sectors in a track on a data storage device. A data storage device identifies the servo sectors in a track by reading distributed index bits from multiple servo sectors in a track. The data storage device analyzes only one index bit from each servo sector to identify the index of a track. In some embodiments, the index of a track can be identified after examining the index bits stored in a particular number of consecutive servo sectors, even in the presence of errors. The index bits in each track can have an error tolerance with a minimum Hamming distance greater than one. In other embodiments, a data storage device compares a sliding window of the index bits read from the servo sectors to all possible N-bit vectors that exist within a pattern of the index bits stored on a track.

20 Claims, 4 Drawing Sheets

TECHNIQUES FOR IDENTIFYING SERVO SECTORS IN STORAGE DEVICES

BACKGROUND OF THE INVENTION

The present invention relates to data storage devices, such as hard disk drives, and more particularly to techniques for identifying servo sectors in data storage devices.

Magnetic recording disk drives incorporate stacked, commonly-rotated rigid magnetic recording disks that are used for storing user data. The data is recorded in radially-spaced data tracks on the surfaces of the disks. Recording heads are moved by an actuator in a generally radial path toward and away from the center of rotation of the disks to read and write data on the disks. Typically, a single recording head, which may be an inductive read/write head or an inductive write head in combination with a magneto resistive read head, is associated with a corresponding magnetic recording surface of each disk.

It is important to know the precise radial and circumferential location of the recording heads relative to their associated disk surfaces. For conventional fixed-block architecture disk drives, position information is typically recorded onto the disk as servo information in angularly spaced servo sectors interspersed among the data sectors.

Each of the servo sectors contains a servo timing mark (STM), which is a defined bit pattern. A servo timing mark is also known as a servo identification (SID) or a servo address mark (SAM). When an STM is identified in reading the disk, subsequent detection of servo information (e.g., track identification and position error signal bursts) is initiated. This servo information is used by servo electronics to determine the radial position of the head and to provide feedback to the actuator to ensure the head remains positioned over the centerline of the desired track. In many disk drives, it is beneficial for the drive to determine the STM as quickly as possible following movement of the head, to speed read and write operations.

The servo information follows the STM. A disk drive can identify the servo information once the STM is found. Accurate detection of STMs is important for being able to correctly recognize subsequent servo information. If a servo sector is not recognized due to failure to detect the STM, the servo electronics relies on less recent servo information (e.g., from the most recently recognized servo sector), and servo tracking and timing accuracy is diminished.

The servo information includes, for example, the PHSN (physical head sector number). The PHSN indicates the number of the current servo sector that is being read by the read head. Each servo sector in a track on a disk includes a unique PHSN relative to the other servo sectors in that track. The PHSN allows a disk drive to distinguish a servo sector from each of the other servo sectors in the same track. The PSHN is followed by the track identification (TID).

Several bits are typically stored in each servo sector to provide a PHSN. As a result, recording a PHSN in each servo sector uses a significant amount of additional disk storage space. Furthermore, even more bits need to be stored in each servo sector to provide protection against errors in the PHSNs.

Therefore, it would be desirable to provide a technique for improving the reliability of servo identification patterns that does not significantly reduce the data storage capacity of the disk.

BRIEF SUMMARY OF THE INVENTION

The present invention provides techniques for identifying the servo sectors in a track on a data storage device. A data storage device identifies the servo sectors in a track (i.e., identifies the index of a track) by reading distributed index bits from multiple servo sectors in a track. The data storage device analyzes only one index bit from each servo sector to identify the index of a track.

In some embodiments of the present invention, the index of a track can be identified after examining the index bits stored in a particular number of consecutive servo sectors, even in the presence of errors. In these embodiments of the present invention, the index bits in each track have an error tolerance with a minimum Hamming distance greater than one.

According to other embodiments of the present invention, a data storage device compares an N-bit sliding window of the index bits read from the servo sectors in a track to all possible N-bit vectors that exist within a pattern of the index bits stored on the track.

Other objects, features, and advantages of the present invention will become apparent upon consideration of the following detailed description and the accompanying drawings.

DETAILED DESCRIPTION OF THE INVENTION

Figure 1:
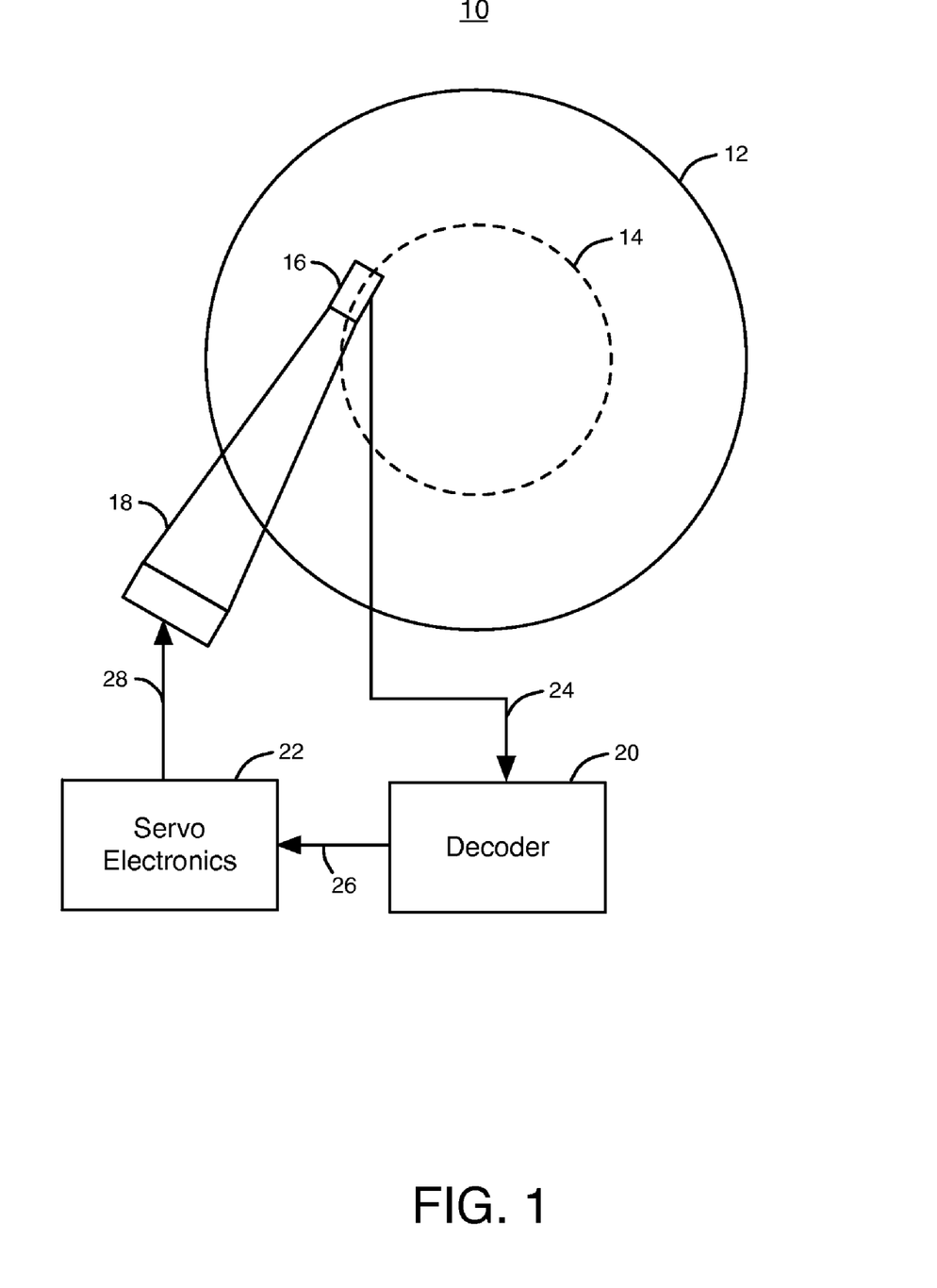
FIG. 1 illustrates a diagram of a hard disk drive system that can perform embodiments of the present invention.

FIG. 1 schematically shows a portion of a hard disk drive 10, according to one embodiment of the present invention. Although techniques of the present invention are discussed herein primarily in the context of hard disk drives, it should be understood that the techniques of the present invention can be applied to other types of data storage devices.

Hard disk drive 10 includes a magnetic hard disk 12, read/write head 16 (also called a data recording transducer), actuator 18, decoder 20, and servo electronics 22. Disk 12 has a set of radially spaced tracks, one of which is shown at 14. Information is written to and/or read from track 14 by read/write head 16. Read/write head 16 is connected to actuator 18, which radially positions head 16 over a selected track.

Read/write head 16 is connected to decoder 20, as indicated by line 24. As track 14 passes under head 16, the head encounters servo sectors and data sectors. Decoder 20 receives a bit stream corresponding to the bit stream recorded on track 14, and functions to detect the servo timing mark (STM) bit pattern in the servo sectors as they pass under head 16. The STM is a fixed vector that helps synchronize the information that follows it. The servo information, such as the track identification (TID) and the servo sector identification, typically follows the STM.

Upon identification of an STM bit pattern, decoder 20 transmits an "STM found" signal to servo electronics 22, as schematically indicated by line 26 in FIG. 1. Servo electronics 22 also receives servo information from decoder 20, and makes use of the servo information, gated by the "STM found" signal, to perform closed loop control of actuator 18, schematically indicated by line 28, such that head 16 is centered over a desired track (i.e., track 14 in this example).

In the prior art, the servo sectors in each track were identified and distinguished from other servo sectors in the same track by storing a set of bits in each servo sector that represented physical head sector numbers (PHSNs). The PHSNs indicate an exact servo number and provide the servo sector identification.

On the other hand, the present invention identifies the servo sectors in each track by reading index bits stored in the servo sectors. Instead of writing multi-bit PHSNs in each servo sector, only one index bit is written in each servo sector to identify each servo sector in a track relative to the other servo sectors in that track. Only one index bit per servo sector is used to perform the servo sector identification.

One index bit cannot by itself distinguish a servo sector from all of the other servo sectors in the same track. Therefore, the disk drive reads a sequence of index bits from multiple consecutive servo sectors to perform the servo sector identification in each track. The index bits are distributed among all of the servo sectors in a track. Although these techniques do not allow the servo sectors in a track to be identified by reading one servo sector, a data storage device can perform the servo sector identification after examining index bits stored in a particular number of consecutive servo sectors, even in the presence of errors, according to some embodiments of the present invention.

The technique of identifying sector sectors in a track to distinguish a servo sector from the other servo sectors in that track by reading index bits, wherein only one index bit is read from each servo sector, is referred to herein as identifying or establishing the index of the track. Typically, a disk drive can identify the index of a track by reading index bits from less than all of the servo sectors in a track. The servo index refers to the first servo sector in each track that is followed by the first data sector in that track.

Decoder 20 usually looks for the servo sector identification within a sliding window of bits. Typically, decoder 20 compares one or more predefined bit patterns to a sliding window of consecutive index bits read from the servo sectors in a track. The disk drive successively steps through the window containing the index bits read from the servo sectors in the track. Reading the bit stream from the servo sectors into a shift register is one example of a technique for providing the sliding window.

Figure 2:
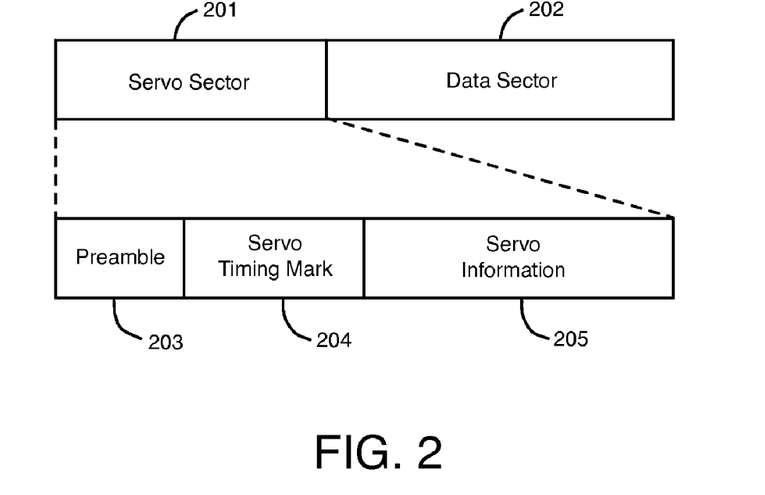
FIG. 2 illustrates a data sector, a servo sector, and information stored in a servo sector that can be used with techniques of the present invention.

FIG. 2 shows a portion of track 14. Track 14 includes servo sectors interspersed with data sectors. A servo sector 201 and a data sector 202 are shown in FIG. 2. FIG. 2 also shows a more detailed view of servo sector 201. Servo sector 201 includes a preamble bit pattern 203, a servo timing mark (STM) 204, and servo information 205. In FIG. 2, the read/write head encounters regions 203-205 in that order. The servo information 205 includes an index bit, according to embodiments of the present invention.

Figure 3:
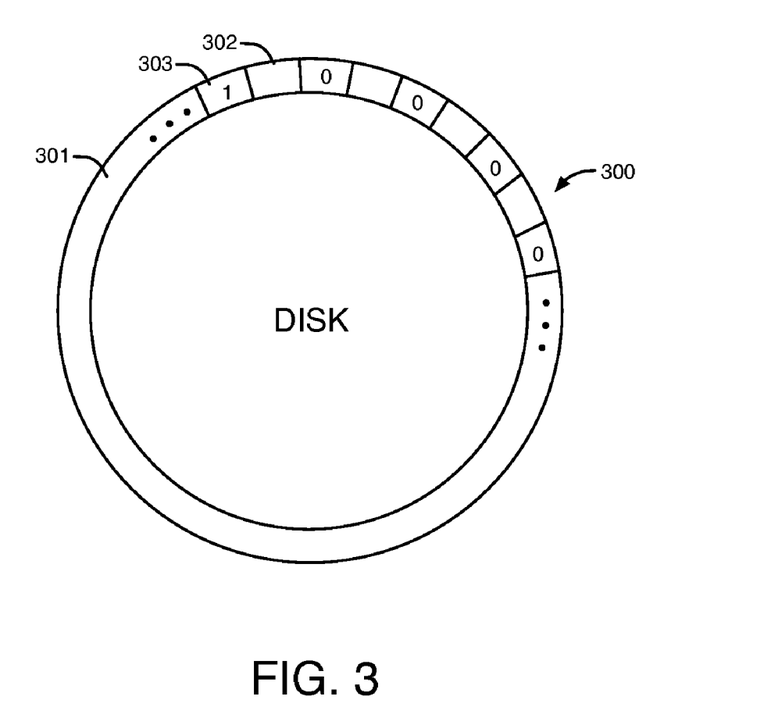
FIG. 3 illustrates an example of a magnetic hard disk that stores only one index bit in each servo sector according to various embodiments of the present invention.

FIG. 3 illustrates an example of a disk 300 that stores index bits in servo sectors, according to an embodiment of the present invention. Disk 300 contains numerous concentric tracks for storing data and servo sectors, but only one track 301 is shown in FIG. 3 to simplify the drawing. Track 301 contains data sectors 302 and servo sectors 303. Sectors 302-303 are not shown to scale relative to the size of track 301 in FIG. 3. Each of the servo sectors 303 stores only one index bit that is used to identify the index of the track, as shown in FIG. 3.

An example of a disk drive system that reads bits from multiple servo sectors to identify the index of a track is now described. Table 1 has 22 rows containing 22 unique 12-bit vectors that together form a 264-bit pattern. Each 12-bit vector in Table 1 is stored in 12 consecutive servo sectors that are identified by the physical head sector numbers (PHSN) shown in the third column of Table 1.

TABLE 1

| STW Sector | 12-Bit Vectors | Servo Sector Range Containing Block ID (PHSN) |
|---|---|---|
| 0 | 000010001000 | 252-263 |
| 12 | 000010001011 | 0-11 |
| 24 | 000010001101 | 12-23 |
| 36 | 000010001110 | 24-35 |
| 48 | 000010011001 | 36-47 |
| 60 | 000010011010 | 48-59 |
| 72 | 000010011100 | 60-71 |
| 84 | 000010011111 | 72-83 |
| 96 | 000010101001 | 84-95 |
| 108 | 000010101010 | 96-107 |
| 120 | 000010101100 | 108-119 |
| 132 | 000010101111 | 120-131 |
| 144 | 000010111000 | 132-143 |
| 156 | 000010111011 | 144-155 |
| 168 | 000010111101 | 156-167 |
| 180 | 000010111110 | 168-179 |
| 192 | 000011001001 | 180-191 |
| 204 | 000011001010 | 192-203 |
| 216 | 000011001100 | 204-215 |
| 228 | 000011001111 | 216-227 |
| 240 | 000011011000 | 228-239 |
| 252 | 000011011011 | 240-251 |

The PHSNs are not stored in the servo sectors. In Table 1, STW stands for servo track writer sector. Only one index bit from the 264-bit pattern of Table 1 is stored in each of the 264 servo sectors on a track.

The disk drive analyzes a sliding window in the input stream read from a track on the disk. The disk drive compares a 12-bit long sliding window of the index bits to the 22 12-bit patterns shown in the rows of Table 1. After 12 bit shifts, the disk drive starts to search for the corresponding vector. The disk drive makes at least 12 bit shifts and at most 23 bit shifts in the 12-bit long sliding window to identify the index of a track using the 264-bit pattern shown in Table 1.

The disk drive can start reading the index bits at any of the 264 index bits within a track. Each of the 12-bit vectors shown in the rows of Table 1 is different from any other 12-bit sequence within the 264-bit pattern. Thus, each of the 22 12-bit vectors shown in the rows of Table 1 is unique with respect to any other sequence of 12 consecutive bits in the 264-bit index pattern on a track, read circularly.

Because each of the 12-bit vectors is unique, the disk drive can accurately identify the location of the index of a track independently of where on a track the read/write head begins reading the index bits. A disk drive can typically identify the index of a track in less time when there are less bits in the unique vectors.

One disadvantage of the approach shown in Table 1 is that the chosen 264-bit pattern does not provide any error tolerance. The minimum Hamming distance of the 12-bit vectors in Table 1 is d=1. The Hamming distance between two patterns refers to the number of bits that are different in the two patterns. Operationally, it is the number of ones in the pattern resulting from the exclusive OR'ing of two input patterns (i.e., performing the Boolean XOR function). For example, bit pattern 111000 differs from bit pattern 101010 by a Hamming distance of 2.

Figure 4A:
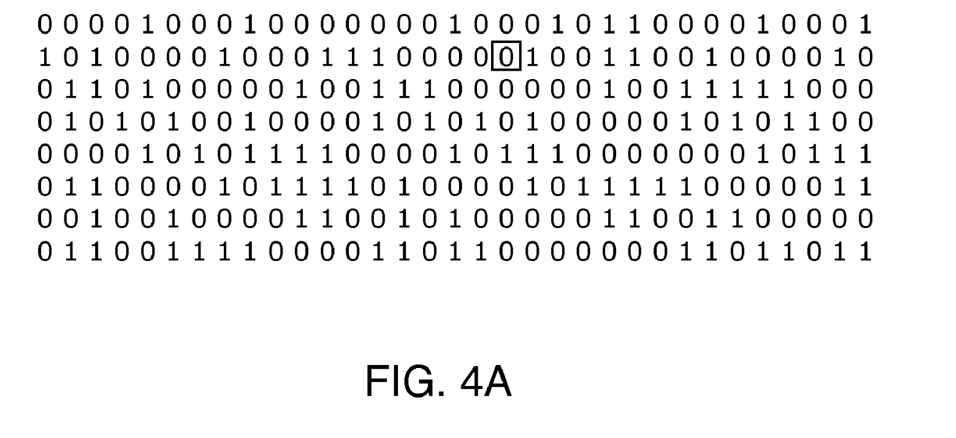
FIG. 4A illustrates a 264-bit pattern that can be used to identify the index of a track.

As an example of the minimum Hamming distance of Table 1, an error may occur in bit 51 of the 264 bits shown in Table 1, where the first bit in the sequence is bit 0, and the last bit in the sequence is bit 263. FIG. 4A illustrates the same 264-bit pattern as Table 1. Bit 51 is enclosed in a square in the 264-bit sequence of FIG. 4A.

Figure 4B:
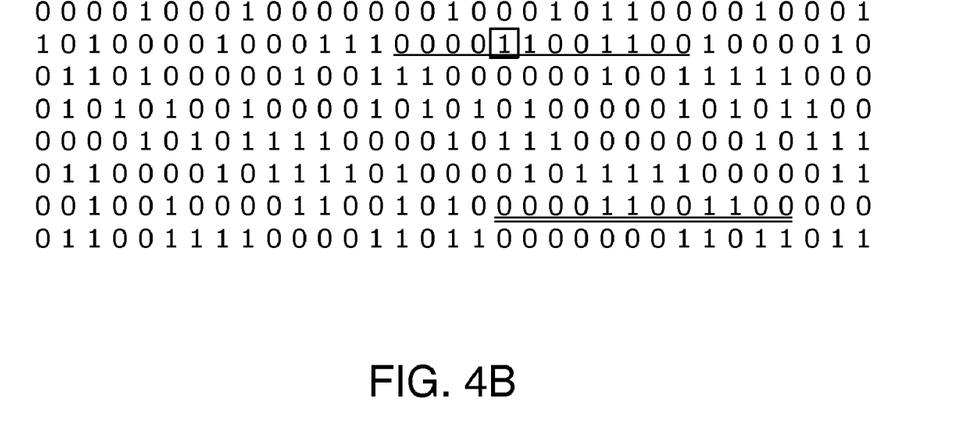
FIG. 4B illustrates the 264-bit pattern of FIG. 4A with one bit in error.

When bit 51 is in error, it changes from 0 to 1, giving the bit pattern shown in FIG. 4B. Bit 51 in error is enclosed in a square in FIG. 4B. The single-underlined 12-bit sequence of FIG. 4B is identical to the 12-bit vector that is double-underlined in FIG. 4B. The double-underlined 12-bit vector is the servo sector bit pattern for PHSNs 204-215 shown in Table 1. Thus, one of the 12-bit vectors of Table 1 is the same as another 12-bit sequence in the 264-bit pattern of Table 1, with bit 51 in error. With only a single bit error at bit 51 in the sequence of Table 1, the disk drive may establish the index of a track at the wrong location.

According to a first embodiment of the present invention, the error tolerance of the index detection scheme of Table 1 is improved by using a sliding window having a length of 13 bits, instead of 12 bits. As a result, the index of a track can be established using at least 13 and at most 24 bit shifts in the 13-bit sliding window, as opposed to 12-23 bit shifts. Complexity increases slightly, because the disk drive checks an extra bit before it can correctly establish the index of a track.

In this embodiment of the present invention, each of the 12-bit vectors shown in Table 1 is extended to include an extra 0 bit to create 22 13-bit vectors. No extra index bits are written onto the disk. Each track still has only 264 index bits, with one bit stored in each servo sector. The window analyzed by the disk drive is merely extended to include at least 13 bits.

Every 13-bit pattern of consecutive bits in the 264-bit pattern shown in Table 1 is at a Hamming distance of at least 2 from any of the extended 22 13-bit vectors. Therefore, one error in one bit never gives the wrong answer. However, this scheme cannot be used to correct any errors.

According to another embodiment of the present invention, the 264-bit pattern shown in Table 1 is stored in the servo sectors in each of the tracks as the index bits, and the disk drive analyzes a sliding window having a length of 23 bits. No extra index bits are written on the disk. Each track still includes 264 index bits with one index bit stored in each of the 264 servo sectors.

The Hamming distance of any 23 consecutive bits in the 264-bit pattern of Table 1 compared to any of the 22 corresponding 23-bit patterns is at least 3, allowing the disk drive system to correct up to one error. However, a disk drive usually uses a longer latency period to identify the index of a track from a sliding window that has a larger number of index bits.

An alternative solution is to use a different 264-bit pattern of index bits having 22 unique 12-bit vectors as shown in Table 2 below, according to a further embodiment of the present invention. The 22 12-bit vectors shown in Table 2 can be used as index bits in servo sectors, with only one index bit stored in each of the 264 servo sectors in a track. The index bits in the servo sectors identified as PHSNs 204 and 219 in Table 2 have been changed relative to Table 1. One bit in each of the two 12-bit vectors has been flipped. The two bits that have been changed relative to the 264-bit pattern of Table 1 are underlined in Table 2.

TABLE 2

| STW Sector | 12-Bit Vectors | Servo Sector Range Containing Block ID (PHSN) |
|---|---|---|
| 0 | 000010001000 | 252-263 |
| 12 | 000010001011 | 0-11 |
| 24 | 000010001101 | 12-23 |
| 36 | 000010001110 | 24-35 |
| 48 | 000010011001 | 36-47 |
| 60 | 000010011010 | 48-59 |
| 72 | 000010011100 | 60-71 |
| 84 | 000010011111 | 72-83 |
| 96 | 000010101001 | 84-95 |
| 108 | 000010101010 | 96-107 |
| 120 | 000010101100 | 108-119 |
| 132 | 000010101111 | 120-131 |
| 144 | 000010111000 | 132-143 |
| 156 | 000010111011 | 144-155 |
| 168 | 000010111101 | 156-167 |
| 180 | 000010111110 | 168-179 |
| 192 | 000011001001 | 180-191 |
| 204 | 000011001010 | 192-203 |
| 216 | <u>1</u>00011001100 | 204-215 |
| 228 | 000<u>1</u>11001111 | 216-227 |
| 240 | 000011011000 | 228-239 |
| 252 | 000011011011 | 240-251 |

As with the previous embodiments of the present invention, when the pattern of index bits of Table 2 is stored on a track, the last bit of the pattern is followed by the first bit, because each track is circular. Each of the 22 12-bit vectors in Table 2 is different than any other sequence of 12 consecutive bits in the 264-bit pattern, read circularly. Thus, each of the 22 12-bit vectors shown in the rows of Table 2 is unique.

The 22 12-bit vectors shown in Table 2 can be written in the servo sectors of a track and used to identify the index of a track using a 12-bit long sliding window. A minimum of 12 bits shifts and a maximum of 23 bits shifts are analyzed in the 12-bit sliding window to identify the index of the track. One index bit is stored in each servo sector on a track.

The embodiment of Table 2 can be used to identify the index of a track within a shorter disk drive latency period relative to the previous two embodiments, because the bit pattern in Table 2 can be used with a window of 12 bits. If a disk drive analyzes a window of 12 bits, the 264-bit pattern of Table 2 provides a minimum Hamming distance (d) of 2. With a Hamming distance of 2, a disk drive system can detect an error in one bit, but no errors can be corrected.

If a window of at least 23 bits is analyzed, the 264-bit pattern of Table 2 provides a minimum Hamming distance of d=3. With a Hamming distance of 3, a disk drive system can detect and correct an error in one bit. If a window of at least 24 bits is analyzed by taking two consecutive 12-bit vectors, the 264-bit pattern of Table 2 provides a minimum Hamming distance of d=5. With a Hamming distance of 5, a disk drive system can detect and correct errors in two bits.

Another 264-bit pattern having 22 unique 12-bit vectors is shown in Table 3 below, according to another embodiment of the present invention.

TABLE 3

| STW Sector | 12-Bit Vectors | Servo Sector Range Containing Block ID (PHSN) |
|---|---|---|
| 0 | 010001100101 | 252-263 |
| 12 | 010011001101 | 0-11 |
| 24 | 010111010011 | 12-23 |
| 36 | 011001001011 | 24-35 |
| 48 | 010100010111 | 36-47 |
| 60 | 111010101111 | 48-59 |
| 72 | 010111000000 | 60-71 |
| 84 | 100101111001 | 72-83 |
| 96 | 100100110100 | 84-95 |
| 108 | 000110011100 | 96-107 |
| 120 | 001110110010 | 108-119 |
| 132 | 101100001010 | 120-131 |
| 144 | 111111010110 | 132-143 |
| 156 | 001111101110 | 144-155 |
| 168 | 111001000001 | 156-167 |
| 180 | 111011111001 | 168-179 |
| 192 | 001010100101 | 180-191 |
| 204 | 001000011101 | 192-203 |
| 216 | 000110110011 | 204-215 |
| 228 | 000010001011 | 216-227 |
| 240 | 010011010111 | 228-239 |
| 252 | 110001101111 | 240-251 |

The 22 12-bit vectors shown in Table 3 can be used as index bits in servo sectors, with only one index bit stored in each of the 264 servo sectors in a track. When the 264-bit pattern of Table 3 is stored on a track, the last bit of the 264 bits is followed by the first bit, because each track is circular. Each of the 22 12-bit vectors in the rows of Table 3 is different than any other sequence of 12 consecutive bits in the 264-bit pattern, read circularly. A disk drive can compare a minimum of 12 bit shifts and a maximum of 23 bit shifts in a 12-bit long sliding window to the 22 12-bit vectors of Table 3 to identify the index of a track within a minimum Hamming distance of d=2.

According to another embodiment, the 264-bit pattern of Table 3 can also provide an increased level of error tolerance. The 264-bit pattern in Table 3 provides a minimum Hamming distance of d=3 for a window having a length of 17 bits. 22 unique 17-bit vectors from Table 3 are formed by appending each of the 22 vectors of length 12 in Table 3 to the first 5 bits of the next vector taking cyclically, i.e., the last vector is followed by the first vector. A disk drive can compare a sliding window that is 17 bits long to these 22 unique 17-bit vectors to identify the index of a track, while being able to detect and correct one error in one bit. No additional index bits need to be stored in a track other than the 264-bit pattern shown in Table 3.

For example, if the 264-bit pattern of Table 3 tolerates one error (corresponding to minimum distance of d=3), a decoder in the disk drive establishes the index of a track when the vector of bits currently in the sliding window is within Hamming distance of 1 from one of the target vectors from Table 3 when the 5 bits of the next codeword are appended as described above. A complicated decoding mechanism is not needed to correct or detect errors. The decoder simply checks if the bits in the sliding window are within a predetermined distance from one of the predefined stored vectors.

The 264-bit pattern of Table 3 provides a minimum Hamming distance of d=4 when the disk drive analyzes a window having a length of 23 bits. With a Hamming distance of 4, errors in two bits can be detected, but an error in only one bit can be corrected. A disk drive can compare a window that is 23 bits long to 22 unique 23-bit vectors from Table 3 to identify the index of a track, while being able to detect 2 errors in 2 bits and correct one error in one bit.

The 264-bit pattern of Table 3 provides a minimum Hamming distance of d=5 when the disk drive analyzes a window having a length of 24 bits. A disk drive can compare a window that is 24 bits long to 22 unique 24-bit vectors from Table 3 to identify the index of a track, while being able to detect and correct 2 errors in 2 bits.

Index bit patterns having 264 bits per track are described herein as examples of the present invention and are not intended to limit the scope of the present invention to bit patterns having exactly 264 bits. The techniques of the present invention can also be applied to index bit patterns having a different number of bits and corresponding servo sectors per track.

To minimize the number of shifts performed by the disk drive to identify the index of a track, all possible 264 vectors of a certain bit-length can be analyzed for a minimum Hamming distance d. However, this procedure increases complexity. The techniques described above with respect to Tables 1-3 involve comparing index bits in a sliding window read from the servo sectors with only 22 predefined vectors that are shown in Tables 1, 2, or 3.

In the embodiments described below, the data storage device compares an N-bit sliding window of index bits read from the servo sectors in a track to all possible 264 vectors having a particular bit-length of N-bits, read circularly, as opposed to comparing the sliding window of index bits to only the 22 original vectors. This technique increases the complexity of identifying the index of a track, because the disk drive has to compare the index bits in the sliding window to more predefined vectors. However, an advantage of this technique is that a disk drive can identify the index of a track after a fixed number of shifts in the sliding window. In the embodiments described above with respect to Tables 1-3, the number of shifts used to identify the index of a track is variable, e.g., between 13 and 25 shifts.

Figure 5:
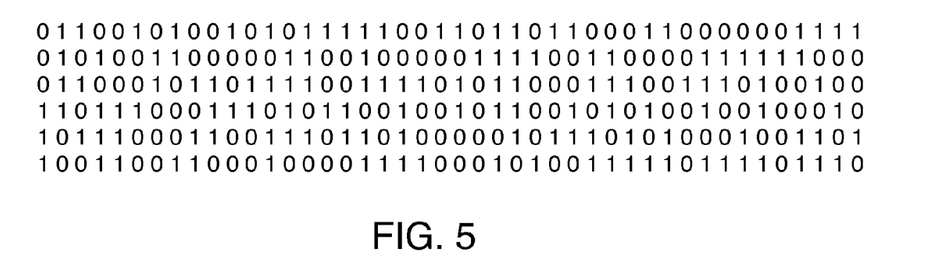
FIG. 5 illustrates a 264-bit pattern that can be used to identify the index of a track, according to an embodiment of the present invention.

Another 264-bit pattern that can be used to identify the index of a track is shown in FIG. 5, according to a further embodiment of the present invention. One bit of the 264-bit pattern is stored in each of the 264 servo sectors on a track. In the embodiment of FIG. 5, when the 264-bit pattern of index bits is stored on a track, the last bit of the 264-bit pattern is followed by the first bit, because each track is circular.

The 264-bit pattern shown in FIG. 5 has the property that any 11-bit vector of consecutive bits (starting from any of the 264 bits) is different from any other 11-bit vector of consecutive bits. The Hamming distance between each of the 11-bit vectors is at least 1 (d=1). Thus, the 264-bit vector of FIG. 5 does not provide fault tolerance. A disk drive can compare index bits in a window 11 bits long to 264 possible 11-bit vectors from FIG. 5 to identify the index of a track.

Figure 6:
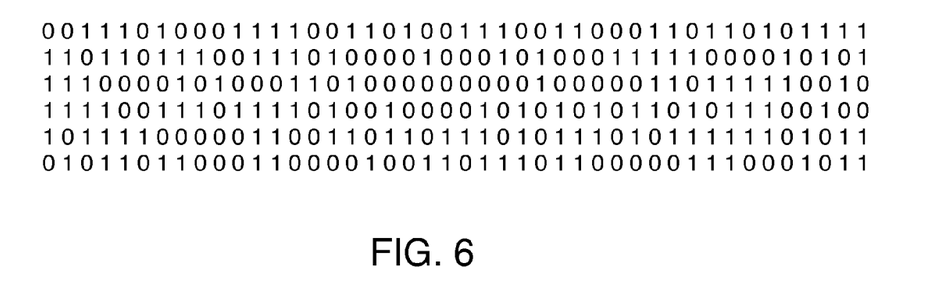
FIG. 6 illustrates a 264-bit pattern that can be used to identify the index of a track and that provides increased error tolerance, according to an additional embodiment of the present invention.

Another 264-bit pattern that can be used to identify the index of a track, while providing increased error tolerance, is shown in FIG. 6, according to an additional embodiment of the present invention. One bit of the 264-bit pattern is stored in each of the 264 servo sectors on a track. In the embodiment of FIG. 6, when the 264-bit pattern of index bits is stored on a track, the last bit of the 264-bit pattern is followed by the first bit, because each track is circular.

The 264-bit pattern shown in FIG. 6 has the property that any 15-bit vector of consecutive bits (starting at any of the 264 bits) is at a Hamming distance of at least 2 (d=2) from any other 15-bit vector of consecutive bits. An error in one bit can be detected by analyzing a window having a length of 15 bits. Thus, a disk drive can compare index bits in a window that is 15 bits long to 264 possible 15-bit vectors from FIG. 6 to identify the index of a track in 15 bit shifts.

To achieve a minimum Hamming distance of d=3 using the 264-bit pattern of FIG. 6, a disk drive can perform 19 shifts in a sliding window that is 19 bits long to identify the index of a track, while being able to detect and correct one error in one bit. Any 19-bit vector of consecutive bits in FIG. 6 is at a Hamming distance of at least 3 from any other 19-bit vector of consecutive bits.

To achieve a minimum Hamming distance of d=4 using the 264-bit pattern of FIG. 6, a disk drive can perform 23 shifts in a 23-bit long sliding window to identify the index of a track, while being able to detect errors in 2 bits and correct an error in one bit. Any 23-bit vector of consecutive bits in FIG. 6 is at a Hamming distance of at least 4 from any other 23-bit vector of consecutive bits.

To achieve a minimum Hamming distance of d=5 using the 264-bit pattern of FIG. 6, a disk drive can perform 28 shifts in a 28-bit long sliding window to identify the index of a track, while being able to detect and correct 2 errors in 2 bits. Any 28-bit vector of consecutive bits in FIG. 6 is at a Hamming distance of at least 5 from any other 28-bit vector of consecutive bits.

Figure 7:
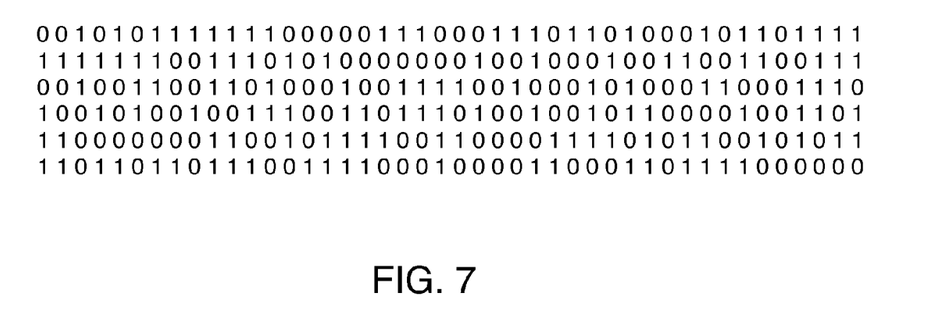
FIG. 7 illustrates another 264-bit pattern that can be used to identify the index of a track and that provides increased error tolerance, according to an additional embodiment of the present invention.

FIG. 7 shows yet another 264-bit pattern that can be used to identify the index of a track, while providing increased error tolerance and reducing disk drive latency, according to an additional embodiment of the present invention. One bit of the 264-bit pattern is stored in each of the 264 servo sectors on a track. In the embodiment of FIG. 7, when the 264-bit pattern of index bits is stored on a track, the last bit of the 264-bit pattern is followed by the first bit, because each track is circular.

The 264-bit pattern shown in FIG. 7 has the property that any 18-bit vector of consecutive bits (starting from any of the 264 bits) is at a Hamming distance of at least 3 (d=3) from any other 18-bit vector of consecutive bits. Thus, a disk drive can compare index bits in an 18-bit long sliding window to 264 possible 18-bit vectors from FIG. 7 to identify the index of a track in 18 bit shifts. At the same time, the disk drive can detect and correct one error in one bit, no matter which bit in the 264-bit pattern of FIG. 7 is the first bit analyzed in the sliding window.

To achieve a minimum Hamming distance of d=4 using the 264-bit pattern of FIG. 7, a disk drive can perform 22 bit shifts in a sliding window that is 22 bits long to identify the index of a track, while being able to detect 2 errors in 2 bits and correct one error in one bit. Any 22-bit vector of consecutive bits in FIG. 7 is at a Hamming distance of at least 4 from any other 22-bit vector of consecutive bits.

To achieve a minimum Hamming distance of d=5 using the 264-bit pattern of FIG. 7, a disk drive can perform 26 bit shifts in a sliding window that is 26 bits long to identify the index of a track, while being able to detect and correct 2 errors in 2 bits. Any 26-bit vector of consecutive bits in FIG. 7 is at a Hamming distance of at least 5 from any other 26-bit vector of consecutive bits.

The foregoing description of the exemplary embodiments of the present invention has been presented for the purposes of illustration and description. It is not intended to be exhaustive or to limit the present invention to the precise form disclosed. A latitude of modification, various changes, and substitutions are intended in the present invention. In some instances, features of the present invention can be employed without a corresponding use of other features as set forth. Many modifications and variations are possible in light of the above teachings, without departing from the scope of the present invention. It is intended that the scope of the present invention be limited not with this detailed description, but rather by the claims appended hereto.

The invention claimed is:

1. A data storage device comprising:
   a decoder that reads index bits from servo sectors on a data storage medium to identify an index of the servo sectors in a track, wherein only one of the index bits is stored in each servo sector, and
   wherein a pattern of the index bits is stored in servo sectors in at least one track on the data storage medium, wherein the pattern of the index bits includes a plurality of N-bit vectors in each track, and wherein each of the N-bit vectors is unique with respect to any other sequence of N consecutive bits in the pattern of the index bits on a track.

2. The data storage device defined in claim 1 wherein the data storage device is a hard disk drive that further comprises:
   a disk comprising a plurality of concentric tracks containing the servo sectors;
   a head configured to read data and servo information from the servo sectors on the disk;
   an actuator connected to the head for positioning the head to different tracks and maintaining the head on the tracks; and
   servo electronics coupled to the decoder for controlling the actuator in response to the servo information read by the head from the servo sectors.

3. The data storage device defined in claim 1 wherein the pattern of the index bits stored in the at least one track of the data storage medium has a fault tolerance defined by a minimum Hamming distance greater than two.

4. The data storage device defined in claim 1 wherein the pattern of the index bits stored in the at least one track of the data storage medium has a fault tolerance defined by a minimum Hamming distance greater than three.

5. The data storage device defined in claim 1 wherein the pattern of the index bits stored in the at least one track of the data storage medium has a fault tolerance defined by a minimum Hamming distance greater than four.

6. The data storage device defined in claim 1 wherein the data storage device compares an N-bit sliding window of the index bits read from the servo sectors to all possible N-bit vectors that exist within the pattern of the index bits stored in the at least one track.

7. A data storage device comprising:
   a decoder that reads index bits from servo sectors on a data storage medium to identify an index of the servo sectors in a track, wherein only one of the index bits is stored in each servo sector, and
   wherein a pattern of the index bits is stored in servo sectors in at least one track on the data storage medium, and wherein the data storage device compares an N-bit sliding window of the index bits read from the servo sectors to a predefined set of N-bit vectors that exist within the pattern of the index bits stored in the at least one track, and the predefined set of N-bit vectors is less than all of the possible N-bit vectors within the pattern of the index bits stored in the at least one track.

8. A method for identifying an index of a track on a data storage device, the method comprising:
   recording a pattern of index bits in servo sectors in tracks on a data storage medium, wherein only one index bit is stored in each servo sector; and
   reading the index bits from the servo sectors to identify an index of the servo sectors in a track, wherein the pattern of the index bits includes a plurality of N-bit vectors in each track, and wherein each of the N-bit vectors is unique with respect to any other sequence of N consecutive bits in the pattern of the index bits on the track.

9. The method defined in claim 8 wherein the data storage device is a hard disk drive having a head, the data storage medium is a disk, and the method further comprises:
    positioning the head to different tracks on the disk and maintaining the head on the tracks using an actuator; and
    controlling the actuator using servo electronics in response to servo information read by the head from the servo sectors.

10. The method defined in claim 8 wherein the pattern of index bits stored in at least one track in the data storage medium has a fault tolerance defined by a minimum Hamming distance greater than two.

11. The method defined in claim 8 wherein the pattern of index bits stored in at least one track in the data storage medium has a fault tolerance defined by a minimum Hamming distance greater than three.

12. The method defined in claim 8 wherein the pattern of index bits stored in at least one track in the data storage medium has a fault tolerance defined by a minimum Hamming distance greater than four.

13. The method defined in claim 8 wherein reading the index bits from the servo sectors to identify the index of the servo sectors further comprises comparing an N-bit sliding window of the index bits read from the servo sectors to all possible N-bit vectors that exist within the pattern of index bits stored in a track.

14. A method for identifying in an index of a track on a data storage device, the method comprising:
    recording a pattern of index bits in servo sectors in tracks on a data storage medium, wherein only one index bit is stored in each servo sector; and
    reading the index bits from the servo sectors to identify an index of the servo sectors in a track, and wherein reading the index bits from the servo sectors to identify the index of the servo sectors further comprises comparing an N-bit sliding window of the index bits read from the servo sectors to a predefined set of N-bit vectors that exist within the pattern of index bits stored in a track, and the predefined set of N-bit vectors is less than all of the possible N-bit vectors within the pattern of index bits stored in the track.

15. A data storage device comprising:
    a decoder that reads index bits from servo sectors on a data storage medium to identify an index of the servo sectors in a track,
    wherein a pattern of the index bits is stored in servo sectors in a track of the data storage medium, only one of the index bits is stored in each servo sector,
    wherein the data storage device compares an N-bit sliding window of the index bits read from the servo sectors to a set of N-bit vectors that exist within the pattern of the index bits stored in the track, and wherein each of the N-bit vectors is unique with respect to any other sequence of N consecutive bits in the pattern of the index bits on the track.

16. The data storage device defined in claim 15 wherein the data storage device is a hard disk drive that further comprises:
    a disk comprising a plurality of concentric tracks containing the servo sectors;
    a head configured to read data and servo information from the servo sectors on the disk;
    an actuator connected to the head for positioning the head to different tracks and maintaining the head on the tracks; and
    servo electronics coupled to the decoder for controlling the actuator in response to the servo information read by the head from the servo sectors.

17. The data storage device defined in claim 15 wherein the pattern of the index bits stored in at least one track on the data storage medium has a fault tolerance defined by a minimum Hamming distance greater than one.

18. The data storage device defined in claim 15 wherein the pattern of the index bits stored in at least one track on the data storage medium has a fault tolerance defined by a minimum Hamming distance greater than two.

19. The data storage device defined in claim 15 wherein the pattern of the index bits stored in at least one track on the data storage medium has a fault tolerance defined by a minimum Hamming distance greater than three.

20. The data storage device defined in claim 15 wherein the pattern of the index bits stored in at least one track on the data storage medium has a fault tolerance defined by a minimum Hamming distance greater than four.

* * * * *